United States Patent [19]

Nasu et al.

[11] Patent Number: 4,831,980
[45] Date of Patent: May 23, 1989

[54] OIL COOLER ASSEMBLY WITH INTEGRATED OIL FILTER FOR INTERNAL COMBUSTION ENGINE

[75] Inventors: Kenichi Nasu; Kazuo Kawai, both of Tokyo; Yoshihiro Matsuo, Wako, all of Japan

[73] Assignees: Toyo Radiator Co., Ltd.; Honda Giken Kogyo Co., Ltd., both of Tokyo, Japan

[21] Appl. No.: 216,463

[22] Filed: Jul. 8, 1988

[30] Foreign Application Priority Data

Jul. 13, 1987 [JP] Japan .............................. 62-108116[U]
Jul. 13, 1987 [JP] Japan .............................. 62-108117[U]

[51] Int. Cl.⁴ .............................................. F01M 1/00
[52] U.S. Cl. .......................... 123/196 A; 123/196 AB;
                                                           184/104.2
[58] Field of Search .................... 123/196 AB, 196 A;
                                               184/104.1, 104.2

[56] References Cited

U.S. PATENT DOCUMENTS 4,423,708  1/1984  Sweetland .................... 123/196 AB
4,522,166  6/1985  Toivio ........................ 123/196 AB

FOREIGN PATENT DOCUMENTS 56159109  4/1958  Japan .
  609147  9/1948  United Kingdom ............ 184/104.2

Primary Examiner—E. Rollins Cross
Attorney, Agent, or Firm—Sughrue, Mion, Zinn, Macpeak & Seas

[57] ABSTRACT

An oil cooler assembly with an integrated oil filter, comprises: (i) a casing in which an oil-cooling chamber is formed, the casing constituting an external component attached to an engine block; (ii) a cooler-element unit disposed in the oil-cooling chamber of the casing, the cooler-element unit being provided with a cooling-water passage having a cooling-water inlet portion and a cooling-water outlet portion both of which open into the exterior of the casing; (iii) an oil filter detachably mounted in the oil-cooling chamber of the casing so as to divide the oil-cooling chamber into two compartments, the oil filter being coaxially arranged with the cooler-element unit; and (iv) oil-communication passages by which the two compartments of the oil-cooling chamber are communicated with a lubricating-oil passage provided in the engine block, respectively.

15 Claims, 6 Drawing Sheets

OIL COOLER ASSEMBLY WITH INTEGRATED OIL FILTER FOR INTERNAL COMBUSTION ENGINE

BACKGROUND OF THE INVENTION

1. Field of the Invention:

The present invention relates to an oil cooler assembly with an integrated oil filter for an internal combustion engine employed in automobiles, motorcycles and like automotive vehicles, which assembly constitutes an external part attached to engine blocks of the internal combustion engines, and more particularly relates to one having a simple and compact construction in which the lowest possible number of sealing portions is provided between lubricating-oil passages and cooling-water passages to substantially prevent the lubricating oil from mixing with tee cooling water.

2. Description of the Prior Art:

In the internal combustion engine employed in the automobile and the motorcycle, the engine parts are lubricated and cooled by means of lubricating oil or engine oil circulated through an engine-lubricating system. Namely, in operation, the lubricating oil or engine oil absorbs heat from the engine parts and is drawn out of the engine through lubricating-oil or engine-oil outlet passages provided in the engine case. After that, the engine oil is introduced into the oil cooler in which the heat having been absorbed in the engine oil is transferred to the coolant or cooling water through heat exchange to cool the engine oil. The thus cooled engine oil is returned to the engine parts through lubricating-oil or engine-oil inlet passages provided in the engine On the other hand, during this lubricating/cooling operation of the engine oil circulated through the engine-lubricating system, particles of foreign matter such as carbon and sludge carried by the engine oil are removed from the oil by means of an oil filter provided in the engine-lubricating system.

As described in the above, in case that the oil filter is separated from the oil cooler, their space requirement is relatively large. In addition, they must be connected to each other through communication pipes which increase the fear of oil leakage.

In order to resolve the above problems in Japanese Utility Model Laid-Open No. 56-159109, an oil cooler assembly with an integrated oil filter is proposed In the oil cooler assembly proposed in the above Japanese Utility Model Laid-Open No. 56-159109, a central portion of a cylindrical oil cooler constitutes an oil chamber in which is received an oil filter around which is formed a cooling-water chamber which is separated from tee oil chamber through a cooler element having a complex construction. Heat exchange is conducted between the engine oil and the cooling water through such cooler element.

However, the above-mentioned conventional oil cooler assembly with the integrated oil filter requires many components, and therefore requires many sealing portions between the oil passages and the cooing-water passages provided in the assembly As a result the conventional oil cooler assembly with the integrated oil filter is complex in construction, and therefore increases the fear of oil leakage to cause the engine oil to be mixed with the cooling water.

SUMMARY OF THE INVENTION

It is an object of the present invention to provide an oil cooler assembly with an integrated oil filter, which resolves the above problems inherent in the conventional oil cooler assembly with the integrated oil filter It is another object of the present invention to provide an oil cooler assembly with an integrated oil filter, which is simple in construction while provided with the lowest possible number of sealing portions between the lubricating-oil passages and the cooling-water passages to prevent the lubricating oil from mixing with the cooling water.

It is further another object of the present invention to provide an oil cooler assembly with an integrated oil filter, which is low in its overall height and weight while compact in construction.

It is still further another object of the present invention to provide an oil cooler assembly with an integrated oil filter, which provides a large heat-exchanging area between the lubricating oil and the cooling water to make it possible to be attached even to a small area of an outer surface of an internal combustion engine employed in a small-sized automotive vehicle.

The above objects of the present invention are accomplished by providing:

an oil cooler assembly with an integrated oil filter, comprising:

(i) a casing in which an oil-cooling chamber is formed, said casing constituting an external component attached to an engine block;

(ii) a cooler-element unit disposed in said oil-cooling chamber of said casing, said cooler-element unit being provided with a cooling-water passage having a cooling-water inlet portion and a cooling-water outlet portion both of which open into the exterior of said casing;

(iii) an oil filter detachably mounted in said oil-cooling chamber of said casing so as to divide said oil-cooling chamber into two compartments, sad oil filter being coaxially arranged with said cooler-element unit; and (iv) oil-communication passages by which said two compartments of said oil-cooling chamber are communicated with a lubricating-oil passage provided in said engine block, respectively.

Further, the above objects of the present invention are accomplished by providing:

an oil cooler assembly with an integrated oil filter, comprising:

(i) a casing having a bowl-shaped form a lip portion of which is fixed to said engine block, a bottom portion of said casing being provided with a central hole through which a hollow bolt provided with an oil-communication hole in its peripheral wall passes to be threadably connected with an opening portion of one of said oil-communication passages so that said casing is detachably fixed to an outer surface of said engine block, said casing being provided with an oil-cooling chamber which is communicated with a lubricating-oil passage provided in said engine block;

(ii) a cooler-element unit constructed of a plurality of stacked cooler elements each of which assumes a flat tubular ring-like shape defining a cooling-water passage therein and is communicated with each other, between outer peripheral surfaces of which cooler elements are defined a plurality of lubricating-oil passages, central portions of said cooler elements constituting a through-hole for receiving a bolt, said cooler elements being disposed in said oil-cooling chamber of said casing, said cooler-element unit being provided with said cooling-water passages together with a cooling-water inlet and a cooling-water outlet both of which communicate with said cooling-water passages and open into the exterior of said casing;

(iii) an oil filter detachably mounted in said oil-cooling chamber of said casing so as to divide said oil-cooling chamber into two compartments, said oil filter being so coaxially arranged with said cooler-element unit as to surround the same;

(iv) oil-communication passages by which said two compartments of said oil-cooling chamber are communicated with a lubricating-oil passage provided in said engine block, respectively.

In addition, the above objects of the present invention are accomplished by providing:

an oil cooler assembly with an integrated oil filter, comprising:

(i) a casing having a bowl-shaped form a lip portion of which is fixed to said engine block, a bottom portion of said casing being provided with a central hole through which a hollow bolt provided with an oil-communication hole in its peripheral wall passes to be threadably connected with an opening portion of one of said oil-communication passages so that said casing is detachably fixed to an outer surface of said engine block, said casing being provided with an oil-cooling chamber which is communicated with a lubricating-oil passage provided in said engine block;

(ii) a cooler-element unit constructed of a plurality of stacked cooler elements each of which assumes a flat tubular ring-like shape defining a cooling-water passage therein and is communicated with each other, between outer peripheral surfaces of which cooler elements are defined a plurality of lubricating-oil passages, central portions of said cooler elements constituting a through-hole for receiving a bolt, said cooler elements being disposed in said oil-cooling chamber of said casing, said cooler-element unit being provided with said cooling-water passages together with a cooling-water inlet and a cooling-water outlet both of which communicate with said cooling-water passages and open into the exterior of said casing;

(iii) an oil filter detachably mounted in said oil-cooling chamber of said casing so as to divide said oil-cooling chamber into two compartments, said oil filter assuming a ring-like shape defining a central hole which constitutes a bolt-receiving hole and an oil-communication passage, said oil filter being disposed in a position adjacent to said engine block in assembling;

(iv) oil-communication passages by which said two compartments of said oil-cooling chamber are communicated with a lubricating-oil passage provided in said engine block, respectively.

Additional objects, features and advantages of the present invention will become apparent from the detailed description of preferred embodiments of the present invention, which will be made with reference to the accompanying drawings in which like reference numerals denote like parts.

DESCRIPTION OF THE PREFERRED EMBODIMENTS

Figure 1:
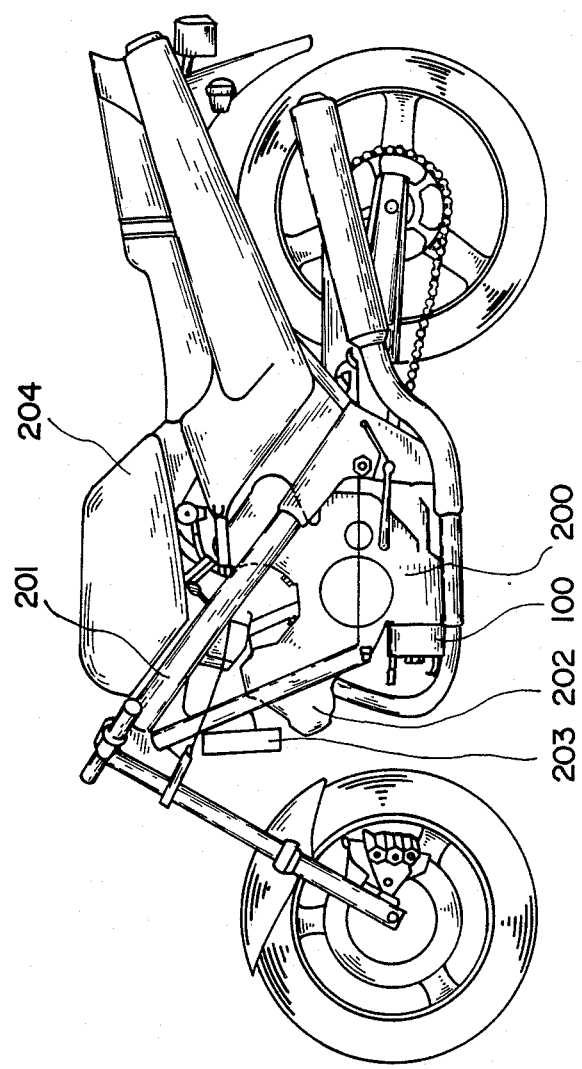
FIG. 1 is a side view of a motorcycle using a V-type water-cooled engine provided with an oil cooler assembly with an integrated oil filter of the present invention.

FIG. 1 shows a motorcycle in which an oil cooler assembly with an integrated oil filter of the present invention is employed, in which a front engine cover is removed to clearly show the construction of a V-type water-cooled internal combustion engine 200 which is mounted in a substantially central portion of the motorcycle body through a main frame 201. A radiator 203, through which the cooling water is air-cooled, is provided in a position in front of a cylinder head 202 of the engine 200. In a front lower portion of the engine 200 is provided an oil cooler assembly 100 with an integrated oil filter of the present invention, which assembly 100 is communicated with the engine 200 through oil-communication pipes 210. Incidentally, in the drawings, the reference numeral 204 denotes a fuel tank.

Figure 2:
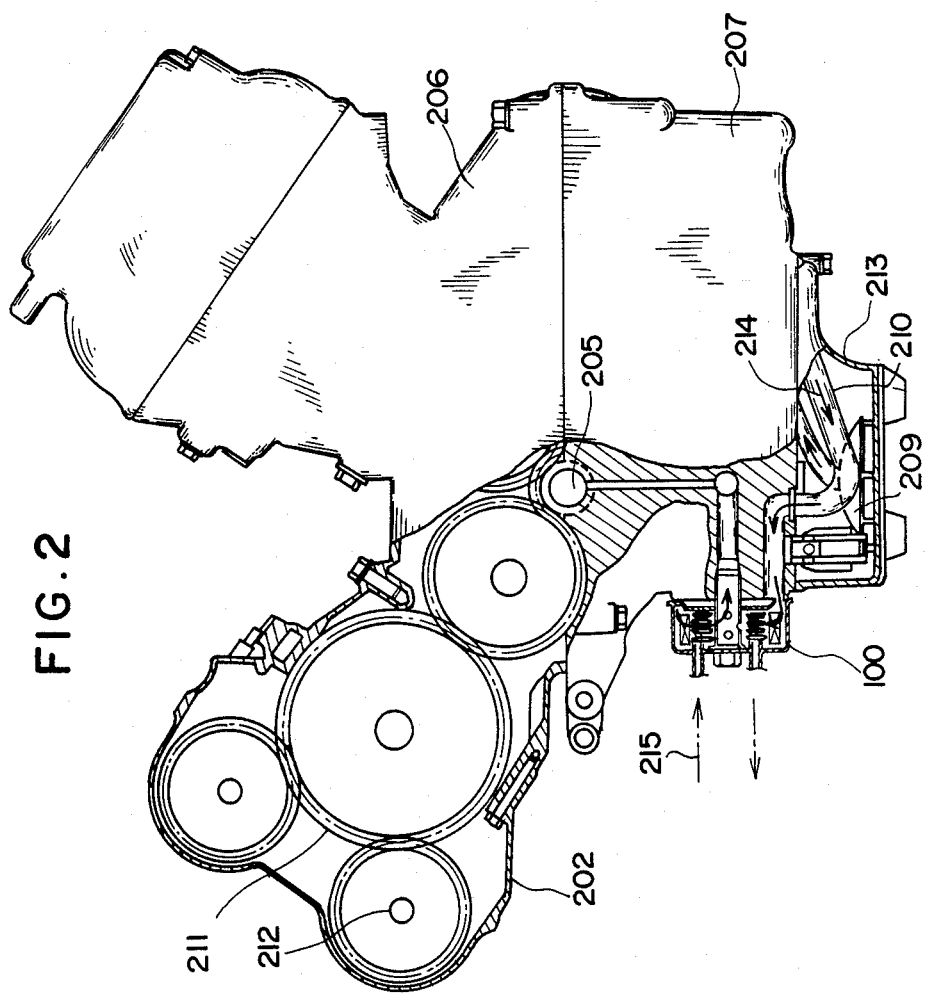
FIG. 2 is a partially sectional view of the engine shown in FIG. 1.

FIG. 2 is a partially broken side view of the engine 200 in which a crankshaft 205 is rotatably sandwiched between an upper crankcase half 206 and a lower crankcase half 207 through bearings. The oil cooler assembly 100 of the present invention is installed in front of the lower crankcase half 207. A lubricating oil or engine oil 214 received in an oil pan 213 is pumped by an oil pump (not shown) from the oil pan 213 through an oil strainer 209 so as to be transported to the oil cooler assembly 100 through one of the oil-communication pipes 210. Incidentally, in the drawings, the reference numeral 211 denotes a gear train for driving a camshaft 212 provided in a cylinder head 202. On the other hand, a cooling water 215 received in a water tank of the radiator 203 is introduced into a cooler element unit 5 of the oil cooler assembly 100 of the present invention, as shown in FIG. 3.

Figure 3:
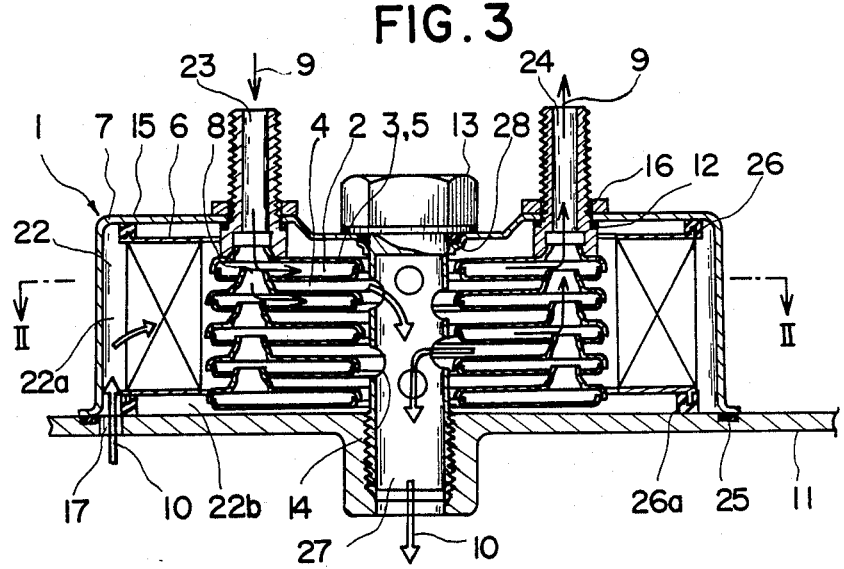
FIG. 3 is a longitudinal sectional view of a first embodiment of the oil cooler assembly with the integrated oil filter of the present invention, taken along the line 1—1 of FIG. 4.
Figure 4:
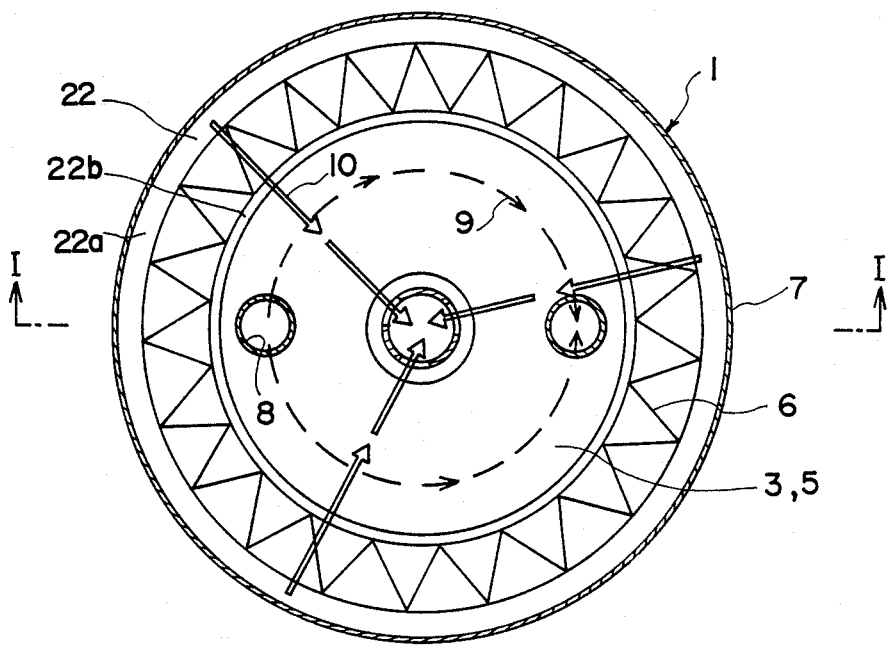
FIG. 4 is a cross-sectional view of the first embodiment of the present invention, taken along the line 11—11 of FIG. 3.

FIGS. 3 and 4 show a first embodiment of the oil cooler assembly 1 with an integrated oil filter 6, which assembly 1 is constructed according to the present invention.

The oil cooler assembly 1 of the present invention is substantially constructed of:

a casing 7 in which an oil-cooling chamber 22 is formed, which casing 7 constitutes an external component detachably attached to the engine 11;

a cooler-element unit 5 disposed in a central portion of the casing 7, which unit 5 assumes a ring-like shape; and an oil filter 6 coaxially arranged with the cooler-element unit 5 in the oil-cooling chamber 22 of the casing 7 so as to surround an outer periphery of the unit 5 in the casing 7.

The cooler-element unit 5 is constructed of a plurality of stacked cooler elements 3. Each of the cooler elements 3 assumes a flat tubular ring-like shape which defines a cooling-water passage 2 therein, and is slightly spaced apart from each other so as to be communicated with each other through a communication hole 8. Between outer peripheral surfaces of the cooler elements 3 are defined a plurality of lubricating-oil passages 4. Central portions of the cooler elements 3 constituting a through-hole for receiving a hollow bolt 13. The cooler elements 3 are disposed in the oil-cooling chamber 22 of the casing 7 while provided with the cooling-water passages 2, and open into the exterior of the casing 7.

Each of the cooler elements 3 is constructed of a pair of annular tray-like metal sheets which are soldered or welded together at their circumferential edge portions so as to form the cooling-water passage 2 therein, as shown in FIG. 3. The cooler element 3 is made of any suitable metal, provided that the metal is good in heat conductivity and rigidity such as aluminum, copper and their alloys.

The communication hole 8 provided in the cooler element 3 is so formed that a flat portion of the cooler element 3 is punched to provide a hole a peripheral edge portion of which is pressed to prepare the burr extending into a bottom hole portion of another cooler element 3, which burr is sealingly connected to the bottom hole portion so as to complete the communication hole 8 of the cooler element 3. It is also possible to replace the burr with a ring-like spacer (not shown) which is interposed between the cooler elements 3 and sealingly connected thereto.

A pair of a cooling-water inlet 23 and a cooling-water outlet 24, which are constructed of pipes, are mounted in an upper surface of the uppermost one of the cooler elements 3 as shown in FIG. 3, these inlet 23 and outlet 24 open to the exterior of the casing 7 so as to be communicated with the radiator 203 mounted in front of the engine 200. The cooling-water inlet 23 is diametrically opposed to the cooling-water outlet 24 on the uppermost cooler element 3.

The integrated oil filter 6 is detachably so mounted in the oil-cooling chamber 22 of the casing 7 so as to surround the outer periphery of the cooler-element unit 5, whereby as shown in FIG. 4 the oil-cooling chamber 22 is divided into two compartments 22a and 22b through the oil filter 6 which is constructed of an annular multi-folding accordion-like sheet made of any suitable fibrous or porous material such as paper, felt and like materials excellent in oil-permeability.

In order to detachably mount the oil filter 6 in the oil-cooling chamber 22 of the casing 7, a ring-shaped sealing element 26 is provided in an upper surface of the oil-cooling chamber 22 of the casing 7, which ling element 26 is provided with an annular groove into which an upper annular projection of the oil filter 6 is inserted in assembling. The upper annular projection is provided in an upper surface of the oil filter 6 as shown in FIG. 3.

On the other hand, as is clear from FIG. 3, also in a lower surface of the oil filter 6 is provided a lower annular projection which is similar in shape to the upper annular projection of the oil filter 6. Another ring-shaped sealing element 26a, which is similar in shape to the above sealing element 26, is fixedly mounted on the lower annular projection of the oil filter 6, and cooperates with the sealing element 26 to prevent a lubricating oil or engine oil 10 from leaking from portions in the vicinities of the upper and lower surfaces of the oil-cooling chamber 2 of the casing 7 after the casing 7 is attached to the engine block 11 in assembling.

The sealing elements 26 and 26a are made of any resilient and oil-resistant material such as silicone rubber and like plastic materials.

The casing 7 is constructed of a suitable metal sheet which is good in heat-conductivity such as steel sheet and aluminum sheet. The casing 7 assumes a bowl-like shape having a bottom portion 15 and a lip portion which is detachably attached to the engine block 11. In assembling, when the casing 7 is detachably attached to the engine block 11, both of opening portions 17 and 27 of the engine block 11 for passing the lubricating oil 10 are disposed within the casing 7.

In a central portion of the bottom portion 15 of the casing 5 is provided a central hole through which the hollow bolt 13 passes downward as shown in FIG. 3. Also on the bottom portion 15 of the casing 7, a pair of holes for receiving therein the pair of cooling-water inlet 23 and outlet 24 are diametrically opposed to each other.

The hollow bolt 13 is provided with a solid-head portion and a cylindrical hollow-shaft portion in which at least one oil-communication hole 14 is provided. An outer front portion of the cylindrical hollow-shaft portion of the bolt 13 is threaded to form a male screw which is threadably connected to a female screw formed in the opening portion 27 of the lubricating-oil passage provided in the engine block 11. The interior of the hollow bolt 13 constitutes a lubricating-oil passage.

Now, the assembling operation of the first embodiment of the oil cooler assembly with the integrated oil filter 6 of the present invention will be hereinbelow described in detail with reference to FIGS. 3 and 4.

First, the cooler-element unit 5 is inserted into the oil-cooling chamber 22 of the casing 7. Thereafter, the pair of cooling-water inlet 23 and outlet 24 of the cooler-element unit 5 are inserted into the pair of diametrically opposed holes of the bottom portion 15 of the casing 7, respectively. Then, as shown in FIG. 3, the cooler-element unit 5 is fixed to the casing 7 by means of a pair of nuts 16 which are threadably connected to the cooling-water inlet 23 and outlet 24, respectively. At this time, an O-ring 12 is interposed between a shoulder portion of each of the cooling-water inlet 23 and outlet 24 and each of the diametrically opposed holes of the bottom portion 15 of the casing 7 as shown in FIG. 3, so that the cooling-water inlet 23 and outlet 24 are sealingly connected to the diametrically opposed holes of the bottom portion 15 of the casing 7.

Now, in the annular groove of the annular sealing element 26 having been provided inside the bottom portion 15 of the casing 7, the upper annular projection of the oil filter 6 is inserted so that the cylindrical oil filter 6 is mounted in the casing 7. On the other hand, the lower annular projection of the oil filter 6 is also inserted into the annular groove of the annular sealing element 26a.

Then, the hollow bolt 13 is inserted into the central hole of the bottom portion 15 of the casing 7 so as to pass the central through-hole portion of the cooler-element unit 5 as shown in FIG. 3.

The thus assembled oil cooler assembly 1 is attached to the outer surface of the engine block 11. More particularly, in assembling, the lip portion of the casing 7 s abuts on the engine block 11 that both of the opening portions 17 and 27 of the engine block 11 for passing the lubricating oil 10 are disposed within the casing 7. After that, the hollow bolt 13 is threadably connected to the female screw of the opening portion 27 of the engine block 11 so that the oil cooler assembly 1 is fixedly mounted o the engine block 11 as an external component. Then the oil cooler assembly 1 is attached to the engine block 11, an O-ring 28 is interposed between the hollow bolt 33 and the bottom portion 15 of the casing 7 to seal a clearance therebetween, between the lip portion of the casing 7 and the engine block 11 is provided an O-ring 25 to seal a clearance therebetween. In addition, as is clear from FIG. 3, the oil filter 6 of the oil cooler assembly 1 is sealed at its upper and lower surfaces by mean of the annular sealing elements 26 and 26a, respectively The compartments 22a and 22b of the oil-cooling chamber 22 divided by the oil filter 6 are communicated with the opening portions 17 and 27 of the engine block 11, respectively, and further communicated with each other through the oil filter 6.

The cooling operation of the oil cooler assembly 1 thus attached to the engine block 11 is conducted as follows:

In the first embodiment of the oil cooler assembly 1 of the present invention shown in FIGS. 33 and 4, the lubricating oil 10 contained in the engine block 11 is flows into the compartment 22a of the oil-cooling chamber 22 through the opening portion 17 of the engine block 11, and then passes through the oil filter 6 to flow in the lubricating-oil passages 4 of the cooler-element unit 5 in which the heat exchange is conducted between the lubricating oil 10 and the cooling water 9 to cool the lubricating oil 10. The thus cooled lubricating oil 10 enters the interior of the hollow bolt 13 through the oil-communication hole 14, and returns to the interior of the engine block 11 through the opening portion 27 of the engine block 11.

On the other hand, the cooling water 9 is introduced into the cooler-element unit 5 through the cooling-water inlet 23 to flow in the cooling-water passage 2 of the cooler-element unit 5, and is discharged from the cooling-water outlet 24 as shown in FIG. 3.

As is clear from FIG. 4, in the cooler-element unit 5, the lubricating oil 10 flows radially as indicated by hollow arrows, while the cooling water 9 flows circumferentially as indicated by solid arrows. Since the lubricating oil 10 flows in a manner described above, it is possible to remove firs the particles-of foreign matter such as metal, dust and sludge from the lubricating oil 10 by means of the oil filter 6. As a result, in the engine 200 employing the oil cooler assembly 1 of the present invention, there is no fear that the particles of foreign matter deposit on the complex lubricating-oil passages to clog the sames. Incidentally, in this case, since the cooling water 9 is not brought into contact with moving parts of the engine 200, there is no fear that the particles of foreign matter such as metal enter the cooling water to clog the cooling-water passages. Incidentally, it is also possible that the opening portion 27 of the engine block 11 serves as a lubricating-oil issuing portion, while the opening portion 17 serves as a lubricating-oil receiving portion. In this case, the lubricating oil 9 flows circumferentially in a direction opposite to that indicated by the solid arrows in FIG. 4.

In addition, it is also possible to arrange both of the cooler-element unit 5 and the oil filter 6 in a manner opposite to that illustrated in FIG. 3 so as to surround the oil filter 6 with the cooler-element unit 5 in the casing 7. In this case, the lubricating oil 10 may flows radially in the direction of the hollow arrows shown in FIG. 4 or in the direction opposite to that of the hollow arrows. However, it is preferable to flow the lubricating oil in the direction of the hollow arrows as shown in the first embodiment of the present invention shown in FIG. 4. As is clear from the construction of the first embodiment of the oil cooler assembly 1 of the present invention shown in FIG. 3, since the cooler-element unit 5 is coaxially arranged with the oil filter 6 in the casing 7, it is possible to lower the oil cooler assembly 1 in its overall height, which makes it possible to form the oil cooler assembly 1 into a compact size.

Figure 5:
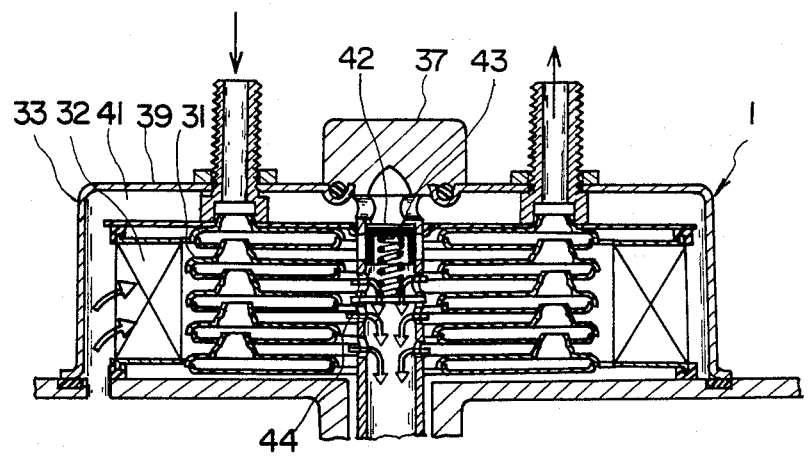
FIG. 5 is a longitudinal sectional view of a second embodiment of the oil cooler assembly with the integrated oil filter of the present invention.
Figure 6:
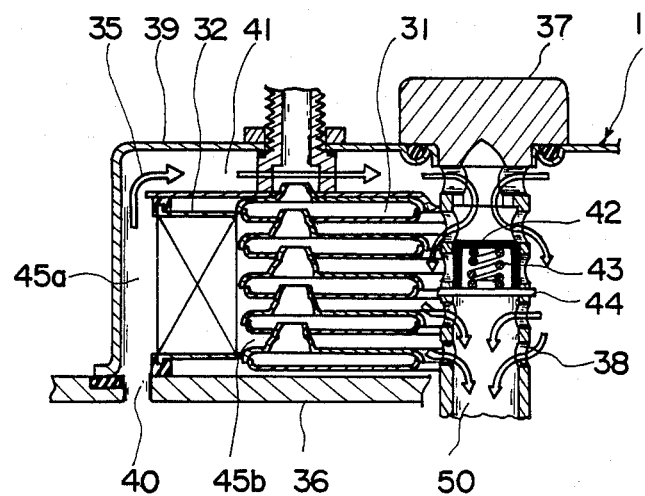
FIG. 6 is a partially enlarged longitudinal sectional view of the second embodiment shown in FIG. 5.

FIGS. 5 and 6 show a second embodiment of the oil cooler assembly 1 of the present invention, which is different from the first embodiment of the present invention shown in FIGS. 3 and 4, only in that: a lubricating-oil by-pass passage 41 is provided between the two compartments (22a, 22b) of the oil-cooling chamber (22) divided by the oil filter 32; and a filter by-pass valve or relief valve 42 is provided in the lubricating-oil by-pass passage 41. The remaining construction of the second embodiment of the present invention shown in FIGS. 5 and 6 is the same as that of the first embodiment of the present invention shown in FIGS. 3 and 4.

In the second embodiment of the present invention shown in FIGS. 5 and 6, the lubricating-oil by-pass passage 41 is formed between the bottom portion 39 of the casing 33 and the upper surface of the cooler-element unit 31 as shown in FIG. 5, and extends to an upper portion of the hollow bolt 37. On the other hand, the relief valve 42 is provided in a central portion of the lubricating-oil by-pass passage 41.

The relief valve 42 is substantially constructed of a cap-like valve element and a compression spring 43 mounted in the cap-like valve element, a lower-end portion of which compression spring 43 is supported by a rod-like supporting member 44 mounted in the shaft portion of the hollow bolt 37.

In operation of the second embodiment of the oil cooler assembly 1 of the present invention, when the oil filter 32 is clogged with foreign matter such as carbon and sludge carried by the lubricating oil to partially or completely prevent the lubricating oil from flowing, the relief valve 42 partially or completely permits the lubricating oil to flow through the by-pass passage 41, to make it possible to prevent the lubricating-oil shortage in the engine parts, whereby the temperature of the lubricating oil is prevented from rapidly increasing.

In a state shown in FIG. 5: the oil filter 32 is not clogged so that the relief valve 42 rests on its normal position; and the lubricating oil 35 is passed through the oil filter 32 while prevented from passing through the lubricating-oil by-pass passage 41 which is shut off by the relief valve 42.

In a state shown in FIG. 6: the oil filter 32 is clogged with the foreign matter to open the relief valve 42. When the oil filter 32 is clogged with the foreign matter, a differential pressure of the lubricating oil 35 produced between the compartments 45a and 45b of the oil-cooling chamber 45 increases. When the differential pressure of the lubricating oil 35 reaches a predetermined value which is set according to the strength of the compression spring 43 of the relief valve 42, the cap-like valve element of the relief valve 42 is moved downward against the resilient force of the compression spring 43 to open the relief valve 42 under the influence of such increasing differential pressure of the lubricating oil 35. As a result, a lubricating-oil by-pass hole 41 formed in the hollow bolt 37 having been closed by the cap-like valve element of the relief valve 42 is opened to be communicated with the interior of the hollow bolt 37 through the oil-communication hole 38 thereof. In this state, as shown in FIG. 6, the lubricating oil 35 is issued from the opening portion 40 of the engine block 36 to an outer peripheral portion of the cooler-element unit 31 through the lubricating-oil passage 41, and enters the interior of the hollow bolt 37 through the oil-communication hole 38 thereof so as to flow into the opening portion 50 of the engine block 36.

In the oil cooler assembly 1 of the present invention, it is also possible to provide a suitable means for detecting at least one of an abnormal value of the differential pressure of the lubricating oil 35, an abnormal state of the lubricating-oil flow and an abnormal condition of the relief valve 42 so as to give the alarm when the oil filter 32 is clogged.

Figure 7:
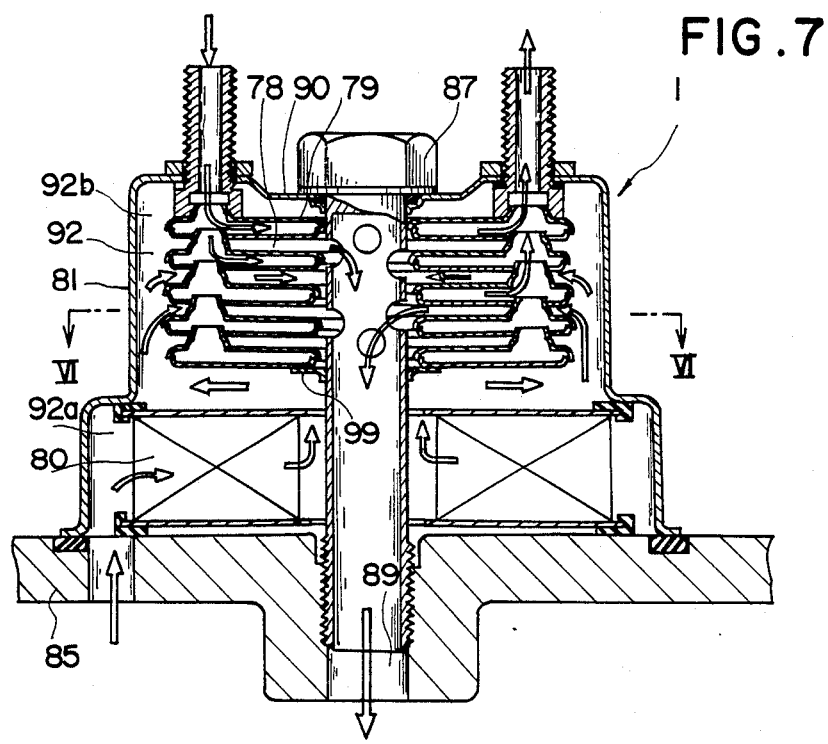
FIG. 7 is a longitudinal sectional view of a third embodiment of the oil cooler assembly with the integrated oil filter of the present invention, taken along the line V—V of FIG. 8.
Figure 8:
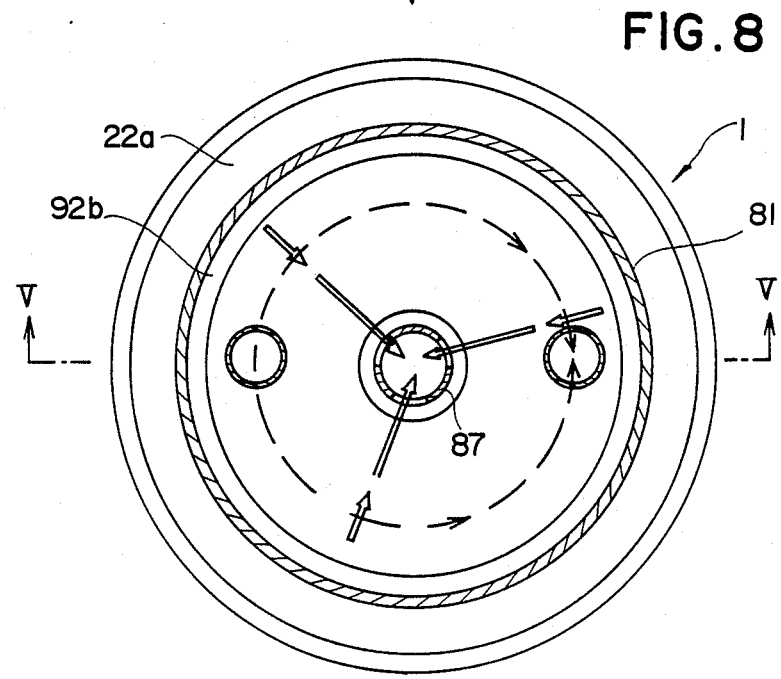
FIG. 8 is a cross-sectional view of the third embodiment of the present invention shown in FIG. 7, taken along the line VI—VI of FIG. 7.

FIGS. 7 and 8 show a third embodiment of the oil cooler assembly 1 of the present invention, in which: FIG. 7 is a view corresponding to that of FIG. 3; and FIG. 8 is a view corresponding to that of FIG. 4. The third embodiment of the present invention shown in FIG. 7 is different from the first embodiment of the present invention shown in FIG. 3, only in that: the cooler-element unit 79 is axially arranged with the oil filter 80. The remaining construction of the third embodiment of the present invention shown in FIG. 7 is the same as that of the first embodiment of the present invention shown in FIG. 3.

In the third embodiment of the oil cooler assembly 1 of the present invention shown in FIG. 7, the casing 81 assumes a bowl-like shape having a bottom portion 90 and a lip portion which is detachably attached to the engine lock 85. The annular cooler-element unit 79 is disposed in the side of the bottom portion 90 of the casing 81. On the other hand, the annular oil filter 80, which is substantially similar in shape to the oil filter 6 of the first embodiment shown in FIG. 3, is disposed on the engine block 85 while axially adjacent to the cooler-element unit 79, as shown in FIG. 7, Each of bolt-passing through-holes is formed in each of the central portions of the annular cooler-element unit 79 and the annular oil filter 80, provided that the bolt-passing through-hole of the oil filter 80 is larger in diameter than the bolt-passing through-hole of the cooler-element unit 79 so that a large annular space is formed between the bolt-passing through-hole of the oil filter 80 and an outer peripheral surface of the hollow bolt 87 when the hollow bolt 87 is inserted into the bolt-passing through-hole of the oil filter 80. Such large annular space constitutes a part of the lubricating-oil passage 78 extending from an lubricating -oil outlet of the oil filter 80 to an lubricating-oil inlet of the cooler-element unit 79. Therefore, in an area corresponding to such part of the lubricating-oil passage 78, the outer peripheral wall of the hollow bolt 87 has no oil-communication hole (14, 38).

An annular sealing element 99 is provided in a position between the outer peripheral surface of the hollow bolt 87 and the lowermost surface of the cooler-element unit 79 to prevent the lubricating oil from leaking from such position when the lubricating oil issued from the lubricating-oil outlet of the oil filter 80 flows to the lubricating-oil outlet of the cooler-element unit 79 through the lubricating-oil passage 78, whereby the lubricating oil is prevented from by-passing the cooler-element unit 79.

As shown in FIG. 7, if necessary, the casing 81 is partially bulged in its peripheral wall to increase the capacity of the compartment 92a of the oil-cooling chamber 92, in which compartment 92a the oil filter 80 is received.

The third embodiment of the present invention shown in FIG. 7 is assembled and installed in a substantially same manner as that of the first embodiment of the present invention shown in FIG. 3, so that the description thereof together with the description of cooling operation thereof is neglected to avoid redundancy in description. Incidentally, the lubricating oil received in the oil-cooling chamber 92 of the casing 81 flows from the compartment 92a of the oil-cooling chamber 92 to the above-mentioned large annular space interposed between the inner peripheral surface of the oil filter 80 and the outer peripheral surface of the hollow bolt 87 through the oil filter 80. Thereafter, the lubricating oil flows axially upward and then radially outward as indicated by the hollow arrows shown in FIG. 7 so a to enter the cooler-element unit 79 radially inwardly through the lubricating-oil passage 78. After that, the lubricating oil flows into the interior of the hollow bolt 87.

In the oil-cooling chamber 92 of the oil cooler assembly 1 of the third embodiment of the present invention shown in FIG. 7, since the cooler-element unit 79 is axially arranged with the oil filter 80, it is possible to reduce the outer diameter of the casing 81. Consequently, in case of a small-sized automotive vehicle such as a motorcycle an engine block of which can not provide a sufficiently large mounting area for the oil cooler assembly, it is possible for the oil cooler assembly 1 of the present invention to obtain a sufficiently large heat-exchange area.

Figure 9:
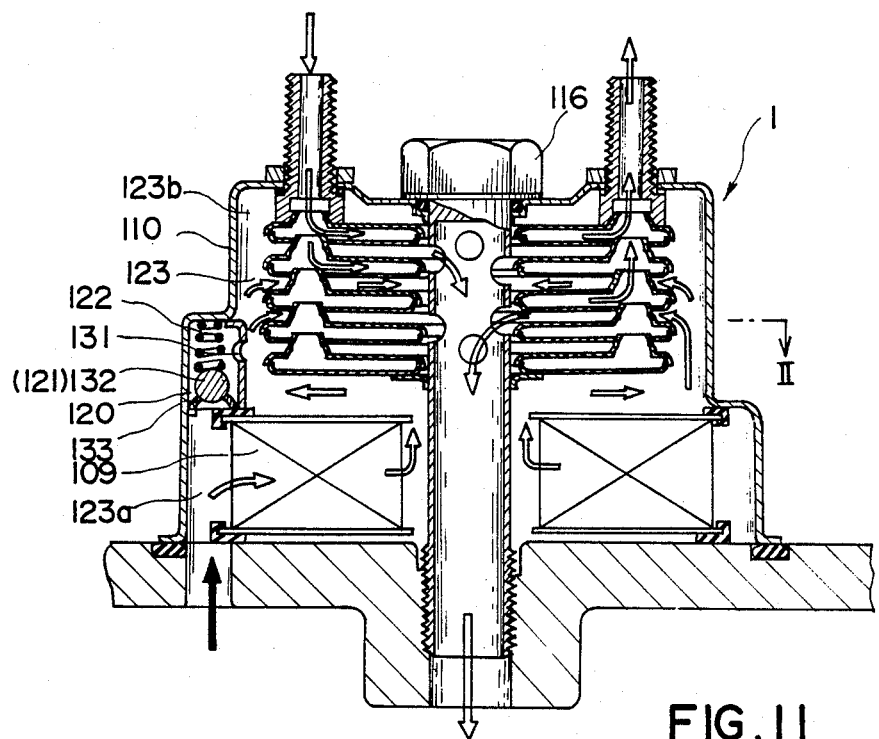
FIG. 9 is a longitudinal sectional view of a fourth embodiment of the oil cooler assembly with the integrated oil filter of the present invention.
Figure 10:
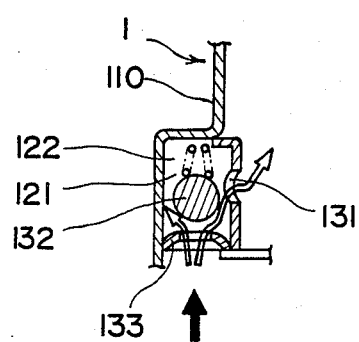
FIG. 10 is a partially enlarged longitudinal sectional view of the fourth embodiment of the present invention shown in FIG. 9.
Figure 11:
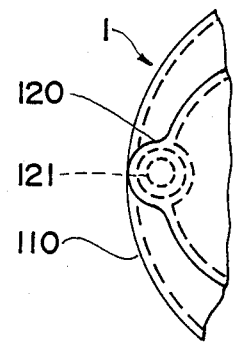
FIG. 11 is a partially enlarged plan view of the fourth embodiment of the present invention shown in FIG. 9.

FIGS. 9 to 11 show a fourth embodiment of the oil cooler assembly 1 of the present invention. The fourth embodiment of the present invention is different from the third embodiment of the present invention shown in FIGS. 7 and 8, only in that: a lubricating-oil by-pass passage 120 is interposed between the compartments 123a and 123b of the oil-cooling chamber 123 which is divided into the compartments 123a and 123b by the oil filter 109; and a relief valve 121 is mounted in the lubricating-oil by-pass passage 120. The remaining construction of the fourth embodiment of the present invention shown in FIG. 9 is the same as that of the third embodiment of the present invention shown in FIG. 7.

The lubricating-oil by-pass passage 120 shown in FIG. 9 is constructed of: a partially bulged portion of the peripheral wall of the casing 110; and a partition wall provided with an oil-communication hole 131, the partition wall being fixedly mounted in the compartment 123a of the oil-cooling chamber 123 in a position corresponding to the above-mentioned partially-bulged portion of the casing 110, a plan view of which bulged portion or by-pass passage 120 is shown in FIG. 11.

As shown in FIG. 10, the relief valve 121 mounted in the lubricating-oil by-pass passage 120 is constructed of: a ball-like valve element 132; a valve seat 133; and a valve spring or compression spring 122 for pressing the valve element 132 against the valve seat 133.

In action and effect, each of the by-pass passage 120 and the relief valve 121 is the same as each of the by-pass passage 41 and the relief valve 42 shown in FIGS. 5 and 6.

While the present invention has been described it is not intended that the present invention be so limited since certain modifications in carrying out the present invention and the constructions set forth which embody the present invention may be made without departing from the scope of the present invention. Accordingly, it is intended that all matter contained in the foregoing description or shown in the accompanying drawings shall be interpreted as illustrative and not in a limited sense. For example, as for the modifications of the present invention, the cooler-element assembly 1 of the present invention can be formed into any suitable shape such as an annular rounded-square shape and an annular elliptical shape in its plan view in addition to an annular circular shape shown in FIG. 4. Further, it is also possible for each of the cooling-water passages and the lubricating-oil passages to be provided with heat-exchange fins. Furthermore, it is also possible for the casing to assume any suitable shape according to various shapes of the cooler-element unit and the oil filter In addition, the casing can be provided with a flange in its lip portion, which flange is fixed to the engine block by means of suitable fastener means such as bolts so as to fix the casing to the engine block. It is also possible to provide a threaded portion in an outer peripheral surface of the casing, which threaded portion of the casing is threadably connected to a threaded portion of the engine block so as to fix the casing to the engine block.

What is claimed is:

1. An oil cooler assembly with an integrated oil filter, comprising:
   (i) a casing in which an oil-cooling chamber is formed, said casing constituting an external component attached to an engine block;
   (ii) a cooler-element unit disposed in said oil-cooling chamber of said casing, said cooler-element unit being provided with a cooling-water passage having a cooling-water inlet portion and a cooling-water outlet portion both of which open into the exterior of said casing;
   (iii) an oil filter detachably mounted in said oil-cooling chamber of said casing so as to divide said oil-cooling chamber into two compartments, said oil filter being coaxially arranged with said cooler-element unit; and
   (iv) oil-communication passages by which said two compartments of said oil-cooling chamber are communicated with a lubricating-oil passage provided in said engine block, respectively.

2. The oil cooler assembly as set forth in claim 1, wherein:
   said cooler-element unit is constructed of a plurality of stacked flat cooler elements which are spaced apart from each other to form lubricating-oil passages between outer peripheral surfaces thereof, the interior of each of which flat cooler elements constitutes an annular cooling-water passage.

3. The oil cooler assembly as set forth in claim 2, wherein:
   said cooler element is constructed of a pair of oppositely disposed tray-like annular metal plates which are connected to each other at their lip portion.

4. The oil cooler assembly as set forth in claim 1, wherein:
   said casing assumes a bowl-like shape provided with: an opening portion fixed to said engine block; and a closed bottom portion;
   said oil cooler assembly further comprises a hollow bolt provided with an oil-communication hole in its peripheral wall to open into the interior of said hollow blot, said hollow bolt being inserted into a through-hole provided in said closed bottom portion of said casing so as to be threadably connected to a threaded portion of an opening portion of said lubricating-oil passages provided in said engine block, whereby said casing constitutes an external component detachably fixed to said engine block, and said oil-cooling chamber is communicated with said lubricating-oil passages of said engine block.

5. The oil cooler assembly as set forth in claim 1, wherein:
   a lubricating-oil by-pass passage is provided between said compartments of said oil-cooling chamber divided by said oil filter;
   a relief valve is provided in said by-pass whereby, when a differential pressure of said lubricating oil between said compartments of said oil-cooling chamber reaches a predetermined value, said relief valve is opened to permit said lubricating oil to pass through said by-pass passage.

6. The oil cooler assembly as set forth in claim 1, wherein: said oil filter is radially arranged with said cooler-element unit.

7. The oil cooler assembly as set forth in claim 6, wherein:
   said lubricating oil passes through said oil filter, and then passes through said cooler-element unit.

8. The oil cooler assembly as set forth in claim 6, wherein:
   said oil filter is so mounted in said casing as to surround an outer peripheral surface of said cooler element unit.

9. The oil cooler assembly as set forth in claim 1, wherein:
   said oil filter is axially arranged with said cooler-element unit.

10. The oil cooler assembly as set forth in claim 9, wherein:
    said oil filter is axially adjacent to said engine block in installation thereof.

11. The oil cooler assembly as set forth in claim 9 or 10, wherein:
    said lubricating oil passes through said oil filter, and then passes through said cooler-element unit.

12. An oil cooler assembly with an integrated oil filter, comprising:
    (i) a casing having a bowl-shaped form a lip portion of which is fixed to said engine block, a bottom portion of said casing being provided with a central hole through which a hollow bolt provided with an oil-communication hole in its peripheral wall passes to be threadably connected with an opening portion of one of said oil-communication passages so that said casing is detachably fixed to an outer surface of said engine block, said casing being provided with an oil-cooling chamber which is communicated with a lubricating-oil passage provided in said engine block;

(ii) a cooler-element unit constructed of a plurality of stacked cooler elements each of which assumes a flat tubular ring-like shape defining a cooling-water passage therein and is communicated with each other, between outer peripheral surfaces of which cooler elements are defined a plurality of lubricating-oil passages, central portions of said cooler elements constituting a through-hole for receiving a bolt, said cooler elements being disposed in said oil-cooling chamber of said casing, said cooler-element unit being provided with said cooling-water passages together with a cooling-water inlet and a cooling-water outlet both of which communicate with said cooling-water passages and open into the exterior of said casing;

(iii) an oil filter detachably mounted in said oil-cooling chamber of said casing so as to divide said oil-cooling chamber into two compartments, said oil filter being so coaxially arranged with said cooler-element unit as to surround the same;

(iv) oil-communication passages by which said two compartments of said oil-cooling chamber are communicated with a lubricating-oil passage provided in said engine block, respectively.

13. The oil cooler assembly as set forth in claim 12, wherein:
said lubricating oil passes through said oil filter, and then passes through said cooler-element unit 14. An oil cooler assembly with an integrated oil filter, comprising:

(i) a casing having a bowl-shaped form a lip portion of which is fixed to said engine block, a bottom portion of said casing being provided with a central hole through which a hollow bolt provided with an oil-communication hole in its peripheral wall passes to be threadably connected with an opening portion of one of said oil-communication passages so that said casing is detachably fixed to an outer surface of said engine block, said casing being provided with an oil-cooling chamber which is communicated with a lubricating-oil passage provided in said engine block;

(ii) a cooler-element unit constructed of a plurality of stacked cooler elements each of which assumes a flat tubular ring-like shape defining a cooling-water passage therein and is communicated with each other, between outer peripheral surfaces of which cooler elements are defined a plurality of lubricating-oil passages, central portions of said cooler elements constituting a through-hole for receiving a bolt, said cooler elements being disposed in said oil-cooling chamber of said casing, said cooler-element unit being provided with said cooling water passages together with a cooling-water inlet and a cooling-water outlet both of which communicate with said cooling-water passages and open into the exterior of said casing;

(iii) an oil filter detachably mounted in said oil-cooling chamber of said casing so as to divide said oil-cooling chamber into two compartments, said oil filter assuming a ring-like shape defining a central hole which constitutes a bolt-receiving hole and an oil-communication passage, said oil filter being disposed in a position adjacent to said engine block in assembling;

(iv) oil-communication passages by which said two compartments of said oil-cooling chamber are communicated with a lubricating-oil passage provided in said engine block, respectively 15. The oil cooler assembly as set forth in claim 14, wherein:
said lubricating oil passes through said oil filter, and then passes through said cooler-element unit

* * * * *